April 28, 1925.  1,535,541
R. W. NOBLE
APPARATUS FOR MEASURING THE QUANTITY OF MILK GIVEN BY EACH COW MILKED BY MILKING MACHINES
Filed Aug. 12, 1922
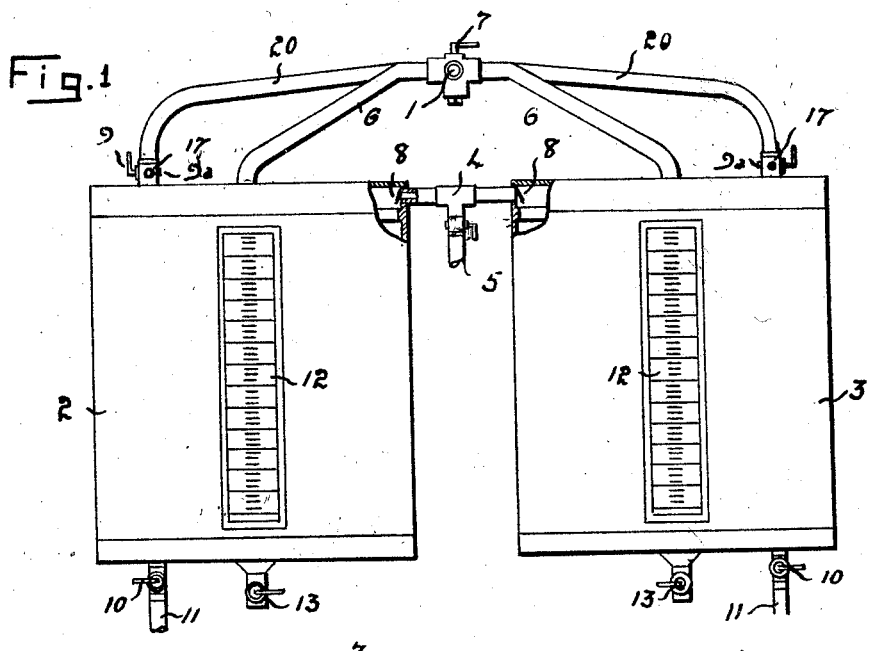
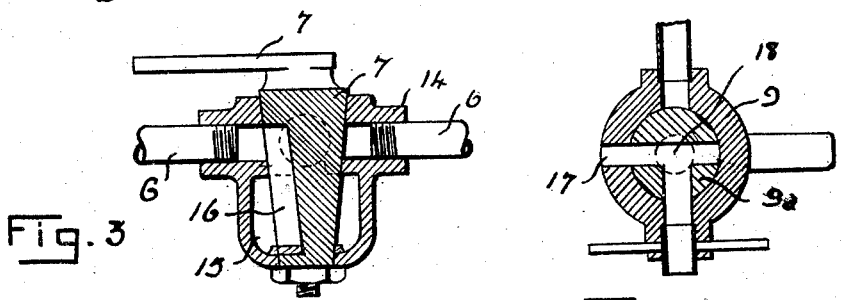
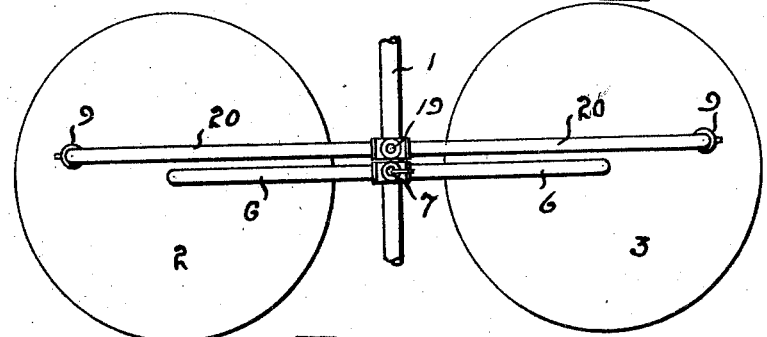
INVENTOR:
Robert Wilson Noble Patented Apr. 28, 1925.

1,535,541

UNITED STATES PATENT OFFICE.

ROBERT WILSON NOBLE, OF TAUHEI, MORRINSVILLE, NEW ZEALAND.

APPARATUS FOR MEASURING THE QUANTITY OF MILK GIVEN BY EACH COW MILKED BY MILKING MACHINES.

Application filed August 12, 1922. Serial No. 581,351.

*To all whom it may concern:*

Be it known that I, ROBERT WILSON NOBLE, a subject of His Majesty the King of the United Kingdom of Great Britain and Ireland, and resident of Tauhei, Morrinsville, in the Provincial District of Auckland and Dominion of New Zealand, have invented new and useful Improvements in Apparatus for Measuring the Quantity of Milk Given by Each Cow Milked by Milking Machines, of which the following is a specification.

This invention relates to that class of means used in conjunction with milking machines, for the purpose of enabling the milk given by each cow to be measured and tested.

The object of the invention is to provide for the aforesaid purpose improved means, for enabling the milk obtained from each cow to be kept under close observation and apart from the milk of other cows in such a manner that it may be readily measured, and so as to facilitate the drawing off of the milk, said improved means being capable of being used to deliver milk where required in the manner of a releaser.

According to the invention the improved means comprises a pair of overhead receptacles, connected near the top of a pipe into which the milk from a set of teat cups passes, said receptacles being also each connected with a cock in the vacuum pipe line, constructed so that the air can be exhausted from either receptacle in order that the milk may be made to enter and collect in the desired receptacle, and so that the vacuum can be cut off from both receptacles, while still acting through the cock.

Each receptacle is also provided at the top with a tap capable of being operated to connect the receptacle with the vacuum pipe or to open said receptacle to atmosphere and at the bottom is provided with a tap having attached a length of tubing whereby on inserting the latter in a bucket and operating the upper and lower taps of a receptacle, strippings may be drawn into same.

A further tap at the bottom of each receptacle provides for the drawing off of the milk from the receptacles.

The receptacles can be made of glass or have a sight opening therein, and are provided with graduated markings for measuring the amount of milk held therein.

The invention will be further described with the aid of the accompanying drawing, wherein:—

Figure 1 is an elevation and
Figure 2 is a plan view of the improved apparatus.
Figure 3 is a vertical section of the tap which is operated to cause milk to be drawn into the receptacles and
Figure 4 is a vertical section of the tap fitted at the top of a receptacle.

In the drawings 1 is the main vacuum pipe through which air is exhausted from the system, and 2, 3 are the overhead receptacles, the latter being connected by a pipe 4 into which milk from a set of teat cups, enters from the tube 5.

Pipes 6 one from the top of each receptacle 2, 3 are connected with a cock 7, inserted in the pipe 1, so that on operating said cock, air can be exhausted from whichever of the receptacles 2, 3 desired and the milk from the tube 5, made to enter the selected receptacle.

In each receptacle 2, 3 a flap valve 8 is provided at the end of the connecting pipe 4, said valves being adapted to open when the receptacle in which either is located is under vacuum, to permit of the entrance of milk thereinto.

The casing 14 of the cock 7 contains a lower chamber 15 which is in communication with the pipe 1 at both sides of the cock, so that vacuum can at all times act through the latter. The plug of said cock contains a vertical recess 16 capable of being turned to open either of the pipes 6 to the chamber 15 and pipe 1 in order that air can be exhausted from either receptacle, while the vacuum also acts through the cock. By giving the plug a quarter turn so as to bring the recess 16 midway between the pipes 6 vacuum is cut off from both receptacles while still acting through the cock.

A tap 9 at the top of each receptacle 2, 3 is put in communication with the vacuum pipe 1 by a pipe 20 while at the bottom of each receptacle is a tap 10 with a length of tubing 11 attached.

In practice the cock 7 is turned to put one of the receptacles in communication through the pipe 1 with the air exhauster, with the result that the milk from the tube 5 enters and collects in said receptacle.

When the cow has been milked to the fullest extent by the machine, the tap 7 is turned so as to put the other receptacle in communication with the pipe 1, and at the same time the teat cups are transferred to another cow. The first cow is then stripped by hand, into a bucket, and the lower end of the tubing 11 placed in said bucket. The tap 9 at the top of the receptacle containing the milk and the tap 10 at the bottom thereof are then both opened, to cause the strippings to be drawn up into the receptacle through the tube 11.

The receptacles 2 and 3 are either made with glass barrels having tops and bottoms clamped thereon and have graduated markings thereon, or are provided with a graduated sight opening 12.

After the quantity of milk in the receptacle has been noted and a sample drawn off if desired through the tap 13 at the bottom, there being one of the latter to each receptacle, the whole of the contents of the latter can be run off through said tap 13.

In order to permit milk to flow from the receptacles through the taps 13, the taps 9 at the top of the receptacles are provided with air ports 17 and with T shaped passage ways 18 in the plugs 9ª, so that on turning a plug 9ª to the position shown in Figure 4, air can be admitted to a receptacle, the shape of the passage 18 also enabling the plug to be turned to connect the pipe 1 and the receptacle, without admitting air.

If desired the pipes 20 can be connected to the pipe 1 by means of a cock 19 similar in construction to the cock 7.

I claim:—

1. In combination, a pair of milk receiving receptacles, an inlet tube common thereto and capable of connection to milking apparatus, a vacuum pipe common to said receptacles, a connection between said pipe and each of said receptacles, and means joining said vacuum pipe with said connections and operable to alternately connect said pipe with said receptacles to permit the milk from said inlet tube to enter only one receptacle at a time.

2. In combination, a pair of milk receiving receptacles, an inlet tube common thereto and capable of connection to milking apparatus, another inlet tube individual to each receptacle, a vacuum pipe common to said receptacles, a connection between said pipe and each of said receptacles, other connections each individual to one of the receptacles, and also joined to said vacuum pipe, means joining said pipe with the first named connections and operable to alternately connect said pipe with said receptacles to permit the milk from the first named inlet tube to enter only one receptacle at a time, and means in said other connections for establishing therethrough communication between said vacuum pipe and either of said individual tubes.

3. In combination, a pair of milk receiving receptacles, an inlet tube common thereto and capable of connection to milking apparatus, another inlet tube individual to each receptacle, a vacuum pipe common to said receptacles, a connection between said pipe and each of said receptacles, other connections each individual to one of the receptacles, and also joined to said vacuum pipe, means joining said pipe with the first named connections and operable to alternately connect said pipe with said receptacles to permit the milk from the first named inlet tube to enter only one receptacle at a time, and means in said other connections for establishing therethrough communication between said vacuum pipe and either of said individual tubes, the latter means also being operable to permit the ingress of air into said receptacles.

ROBERT WILSON NOBLE.

Witnesses:
MARY CHRISTINA BRENNAN,
JOHN WILFRED MANNING.